United States Patent Office 2,918,469
Patented Dec. 22, 1959

2,918,469
PYRIDAZINES

John A. Carbon, Waukegan, Ill., assignor to Abbott Laboratories, North Chicago, Ill., a corporation of Illinois No Drawing. Application February 12, 1958
Serial No. 714,680

13 Claims. (Cl. 260—250)

This invention relates to new chemical compounds of the 4-amino or substituted aminoimidazo [4,5-d] pyridazine series characterized by the following structural formula

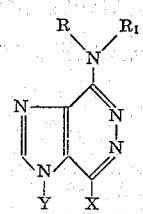

wherein R and $R_1$ are members of the group consisting of hydrogen and lower alkyl, such as methyl, ethyl, propyl, isopropyl, butyl, isobutyl, amyl, isoamyl and the like, X is a member of the group consisting of hydrogen or halogen, such as chlorine, bromine and iodine and Y is a member of the group consisting of hydrogen, lower alkyl or aryl (phenyl) and aralkyl (benzyl).

The compounds in which R and $R_1$ are hydrogen or lower alkyl and X and Y are hydrogen are useful as central nervous system depressants. The compounds in which X and Y are other than hydrogen are essential intermediates in the preparation of the active compounds disclosed in the preceding sentence.

The novel compositions of this invention include the non-toxic acid addition salts which are prepared in the usual manner by reacting the base with a mineral acid such as hydrochloric or sulfuric acid.

The 4-amino or substituted aminoimidazo [4,5-d] pyridazines may be prepared, for example, by reacting a 1-benzyl-4,7-dihaloimidazo [4,5-d] pyridazine with ammonia or mono or di-lower alkylamines. The 1-benzyl-7-halo-4-amino (or mono or di-lower alkylamino) imidazo [4,5-d] pyridazines are subsequently reduced with sodium metal and liquid ammonia to form the active 4-amino or 4-(mono or di-lower alkylamino) imidazo [4,5-d] pyridazines.

The invention is disclosed in further detail by means of the following examples which are set forth for the purpose of illustrating the invention, but, in no way, are to be construed as limiting the invention in spirit or scope.

EXAMPLE I

*1-benzyl-4,7-dichloroimidazo [4,5-d] pyridazine*

Fifty grams (0.207 mole) of 1-benzyl-4,7-dihydroxyimidazo-[4,5-d] pyridazine is refluxed with 500 ml. of phosphorus oxychloride for five hours. After removal of the excess phosphorus oxychloride in vacuo, the residual yellow syrup is poured onto 1000–1500 grams of crushed ice. The mixture is allowed to stand until the gummy product has completely solidified (4–5 hours), the lumps broken up, and the product filtered with suction and washed with water. Recrystallization from 12A ethanol gives 40 grams (68%) of pale yellow needles of 1-benzyl-4,7-dichloroimidazo [4,5-d] pyridazine, M.P. 160–161° C.

Analysis.—Calcd. for $C_{12}H_8N_4Cl_2$: C, 51.63%; H, 2.89%; N, 20.08%; Cl, 25.40%. Found: C, 51.73%; H, 2.82%; N, 20.25%; Cl, 25.42%.

EXAMPLE II

*4-amino-1-benzyl-7-chloroimidazo [4,5-d] pyridazine*

1-benzyl-4,7-dichloroimidazo [4,5-d] pyridazine (100 grams; 0.358 mole) is treated with a solution of 50 ml. liquid ammonia in 500 ml. of 12A ethanol at 150° C. for five hours in a stainless steel autoclave. The product is isolated by suction filtration and thoroughly washed with hot water to remove ammonium chloride. The pale yellow product, 4-amino-1-benzyl-7-chloroimidazo [4,5-d] pyridazine, weighs 48 grams (51.6%), M.P. 269–270° dec.

Analysis.—Calcd. for $C_{12}H_{10}ClN_5$: C, 55.49%; H, 3.88%; N, 26.97%; Cl, 13.66%. Found: C, 55.45%; H, 4.15%; N, 26.84%; Cl, 13.36%.

EXAMPLE III

*1-benzyl-7-chloro-4-(methylamino)imidazo [4,5-d] pyridazine*

1-benzyl-4,7-dichloroimidazo [4,5-d] pyridazine (27.9 grams; 0.10 mole) is mixed with 25 ml. of 12A ethanol containing 15.5 grams (0.50 mole) of methylamine, and heated at 100–110° C. in a one-liter stainless steel bomb for 12 hours, cooled to 4° C., filtered with suction, and washed thoroughly with cold water. Recrystallization from 50% ethanol gives 15.7 grams (57.5% of product, 1-benzyl-7-chloro-4-(methylamino)imidazo [4,5-d] pyridazine, M.P. 185–187° C.

Analysis.—Calcd. for $C_{13}H_{12}ClN_5$: C, 57.04%; H, 4.42%; N, 25.59%. Found: C, 57.13%; H, 4.60%; N, 25.56%.

EXAMPLE IV

*1-benzyl-7-chloro-4-(ethylamino)imidazo [4,5-d] pyridazine*

Treatment of 27.9 grams (0.10 mole) of 1-benzyl-4,7-dichloroimidazo [4,5-d] pyridazine with 250 ml. of 12A ethanol containing 22.5 grams (0.50 mole) of ethylamine at 100–110° C. for 12 hours in a stainless steel bomb, and the product prepared in Example III gives 12.1 grams (42.1%) of product, 1-benzyl-7-chloro-4-(ethylamino) imidazo [4,5-d] pyridazine, M.P. 215–217° C.

Analysis.—Calcd. for $C_{14}H_{14}ClN_5$: C, 58.43%; H, 4.90%; N, 24.34%. Found: C, 58.62%; H, 5.09%; N, 24.40%.

EXAMPLE V

*1-benzyl-7-chloro-4-(n-propylamino)imidazo [4,5-d] pyridazine*

This material is prepared as described above in Example III from 27.9 grams (0.10 mole) of 1-benzyl-4,7-dichloroimidazo [4,5-d] pyridazine, 250 ml. 12A ethanol, and 29.5 grams (0.50 mole) of n-propylamine. Recrystallization from 50% ethanol gives 15.9 grams (52.8%) of product, 1 - benzyl-7-chloro-4-(n-propylamino)imidazo [4,5-d] pyridazine, M.P. 169–171° C.

Analysis.—Calcd. for $C_{15}H_{16}ClN_5$: C, 59.70%; H, 5.34%; N, 23.21%. Found: C, 59.43%; H, 5.55%; N, 23.12%.

EXAMPLE VI

*1-benzyl-7-chloro-4-(dimethylamino)imidazo [4,5-d] pyridazine*

This material is prepared as described above in Example III from 41.8 grams (0.15 mole) of 1-benzyl-4,7-dichloroimidazo [4,5-d] pyridazine, 250 ml. 12A ethanol, and 34 grams (0.75 mole) of dimethylamine. Recrystalized from 3A ethanol to obtain 19.0 grams (44.2%) of colorless crystals of 1-benzyl-7-chloro-4-(dimethylamino) imidazo [4,5-d] pyridazine, M.P. 181–183° C.

Analysis.—Calcd. for $C_{14}H_{14}ClN_5$: C, 58.43%; H, 4.90%; N, 24.34%. Found: C, 58.68%; H, 4.92%; N, 24.29%.

EXAMPLE VII

1-benzyl-7-chloro-4-(diethylamino)imidazo [4,5-d] pyridazine

This material is prepared as described above in Example III from 41.8 grams (0.15 mole) of 1-benzyl-4,7-dichloroimidazo [4,5-d] pyridazine, 250 ml. 12A ethanol, and 55 grams (0.75 mole) of diethylamine. Recrystallized from 3A ethanol to obtain 29 grams (61.4%) of 1-benzyl-7-chloro-4-(diethylamino)imidazo [4,5-d] pyridazine, M.P. 139–140° C.

Analysis.—Calcd. for $C_{16}H_{18}ClN_5$: C, 60.85%; H, 5.74%; N, 22.18%. Found: C, 60.64%; H, 5.85%; N, 22.08%.

EXAMPLE VIII

1-benzyl-7-chloro-4-(di-n-propylamino)imidazo [4,5-d] pyridazine

This material is prepared as described above in Example III from 41.8 grams (0.15 mole) of 1-benzyl-4,7-dichloroimidazo [4,5-d] pyridazine, 250 ml. 12A ethanol, and 76 grams (0.75 mole) of di-n-propylamine. Recrystallized from 3A ethanol to obtain 29.5 grams (57.4%) of 1-benzyl - 7 - chloro - 4 - (di - n - propylamino)imidazo [4,5-d] pyridazine, M.P. 160–161° C.

Analysis.—Calcd. for $C_{18}H_{22}ClN_5$: C, 62.87%; H, 6.45%; N, 20.37%. Found: C, 62.89%; H, 6.51%; N, 20.27%.

EXAMPLE IX

4-(methylamino)imidazo [4,5-d] pyridazine

1 - benzyl - 7 - chloro - 4 - (methylamino)imidazo [4,5-d] pyridazine (15.7 grams; 0.057 mole), suspended in 500 ml. of liquid ammonia, is slowly treated with 6.2 grams (0.27 mole) of sodium metal cut into small pieces. The reaction mixture is protected from atmospheric moisture and vigorously stirred during this addition. After neutralization by the careful addition of 14.4 grams (0.27 mole) of ammonium chloride, the ammonia is allowed to evaporate at room temperature overnight. The residual light-yellow solid is triturated with ether to remove toluene and bibenzyl, and air-dried. The resulting solid is dissolved in hot, dilute HCl, decolorized with Norit, and precipitated by neutralization with 20% NaOH, to obtain 5.5 grams (64.3%) of a white microcrystalline powder of 4-(methylamino)imidazo [4,5-d] pyridazine, M.P. 298–300° C. with decomposition.

Analysis.—Calcd. for $C_6H_7N_5$: C, 48.31%; H, 4.73%; N, 46.96%. Found: C, 48.33%; H, 4.80%; N, 46.95%.

EXAMPLE X

4-(ethylamino)imidazo [4,5-d] pyridazine

This material is prepared as described above in Example IX, using 15.7 grams (0.0546 mole) of 1-benzyl-7-chloro-4-(ethylamino)imidazo [4,5-d] pyridazine, as prepared in Example IV, 500 ml. liquid ammonia, and 5.75 grams (0.25 mol) of sodium. Neutralization is effected with 13.4 grams (0.25 mole) of ammonium chloride. The product, 4 - (ethylamino)imidazo [4,5 - d] pyridazine, formed colorless needles from N,N-dimethylformamide-water, M.P. 280–281° C. with slight decomposition. The yield is 5.4 grams (60.7%).

Analysis—Calcd. for $C_7H_9N_5$: C, 51.52%; H, 5.56%; N, 42.92%. Found: C, 51.67%; H, 5.69%; N, 42.90%.

EXAMPLE XI

4-aminoimidazo [4,5-d] pyridazine hydrochloride 4-amino-1-benzyl-7-chloroimidazo [4,5-d] pyridazine (29.1 grams; 0.112 mole) is added to 600 ml. of liquid ammonia in a 3-necked flask fitted with a drying tube and mechanical stirrer. The stirrer is started, and small pieces of metallic sodium are added over a one-hour period until a permanent deep-blue color is obtained. This requires 11 grams (0.48 mole) of sodium. Ammonium chloride (27.5 grams) is then carefully added in small portions, and the reaction mixture is allowed to evaporate to dryness overnight. The dark-green solid thus obtained is triturated well with ether to remove toluene and bibenzyl, and air-dried. The product, 4-amino imidazo [4,5-d] pyridazine, is recrystallized from water with Norit, and the white solid thus obtained dissolved in a solution of 15 ml. of conc. HCl in 100 ml. of water by warming on the steam bath. Upon cooling to 5° C., the product, 4-aminoimidazo [4,5-d] pyridazine HCl, separates as long, colorless needles, decomposes 334–337° C. Yield 14.9 grams (73.8%).

Analysis.—Calcd. for $C_5H_6ClN_5$: C, 35.00%; H, 3.52%; Cl, 20.66%; N, 40.82%. Found: C, 35.03%; H, 3.68%; Cl, 20.82%; N, 40.73%.

EXAMPLE XII

4-amino-1-methylimidazo [4,5-d] pyridazine 4,7 - dichloro - 1 - methylimidazo [4,5-d] pyridazine (24.1 grams; 0.119 mole) is treated with a solution of 20 ml. liquid ammonia in 200 ml. of 12A ethanol for five cooling, 4-amino-7-chloro-1-methylimidazo [4,5-d] pyridazine is isolated by suction filtration and washed with water to remove ammonium chloride. This material is dissolved in 150 ml. of hot, dilute HCl, decolorized with Norit, and precipitated by the addition of 20% KOH. The product, 4-amino-7-chloro-1-methylimidazo [4,5-d] pyridazine, is thus obtained as a light-tan powder, M.P. 273–275° C. with decomposition. The yield is 11.7 grams (53.4%).

Sixteen grams (0.087 mole) of 4-amino-7-chloro-1-methylimidazo [4,5-d] pyridazine is hydrogenated over a palladium on charcoal catalyst in 200 ml. of glacial acetic acid containing 7.14 grams of sodium acetate. After hydrogen uptake is complete, the mixture is filtered and evaporated to dryness in vacuo. The residue is taken up in 150 ml. of water, neutralized with $NaHCO_3$, and evaporated to dryness again in vacuo. The solid residue is extracted with 1000 ml. of boiling 12A ethanol, filtered to remove some insoluble matter, and cooled slowly to 4° C. The product, 4-amino-1-methylimidazo [4,5-d] pyridazine is thus obtained as 5.7 grams (44%) of colorless needles, M.P. 288–290° C. Upon recrystallization from N,N-dimethylformamide, 4-amino-1-methylimidazo [4.5-d] pyridazine is obtained as colorless needles, M.P. 295–296° C.

Analysis.—Calcd. for $C_6H_7N_5$: C, 58.31%; H, 4.73%; N, 46.96%. Found: C, 48.04%; H, 4.74%; N, 46.76%.

Others may practice the invention in any of the numerous ways which will be suggested by this disclosure to one skilled in the art. All such practice of the invention is considered to be a part hereof provided it falls within the scope of the appended claims.

I claim:

1. A compound selected from the group consisting of bases having the formula

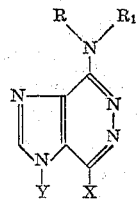

and non-toxic acid-addition salts thereof, wherein R and $R_1$ are selected from the group consisting of hydrogen and lower alkyl; X is selected from the group consisting of hydrogen and halogen, and Y is selected from the group consisting of hydrogen, methyl and benzyl.

2. A base of the general formula

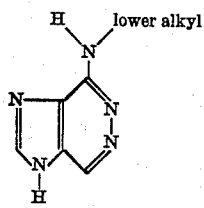

3. A base of the general formula

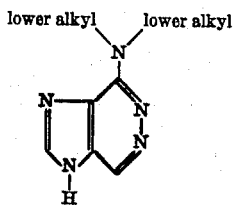

4. 4-amino-1-benzyl-7-chloroimidazo [4,5-d] pyridazine.

5. 4-aminoimidazo [4,5-d] pyridazine.
6. 4-aminoimidazo [4,5-d] pyridazine hydrochloride.
7. 1-benzyl-7-chloro-4-(methylamino)imidazo [4,5-d] pyridazine.
8. 1 - benzyl-7-chloro-4-(lower alkyl amino)imidazo [4,5-d] pyridazine.
9. 1-benzyl-7-chloro-4-(dimethylamino)imidazo [4,5-d] pyridazine.
10. 1-benzyl-7-chloro-4-(dilower alkyl amino)imidazo [4,5-d] pyridazine.
11. 4-(methylamino)imidazo [4,5-d] pyridazine.
12. 4-(ethylamino)imidazo [4,5-d] pyridazine.
13. 4-amino-1-methylimidazo [4,5-d] pyridazine.

No references cited.